US012337492B2

(12) United States Patent
Whitmore, IV

(10) Patent No.: US 12,337,492 B2
(45) **Date of Patent: *Jun. 24, 2025**

(54) SHAVING RAZOR DEMONSTRATION METHOD

(71) Applicant: The Gillette Company LLC, Boston, MA (US)

(72) Inventor: Joseph Lorenzo Whitmore, IV, Johnston, RI (US)

(73) Assignee: The Gillette Company LLC, Boston, MA (US)

(*) Notice: Subject to any disclaimer, the term of this patent is extended or adjusted under 35 U.S.C. 154(b) by 434 days.

This patent is subject to a terminal disclaimer.

(21) Appl. No.: 17/837,699

(22) Filed: Jun. 10, 2022

(65) Prior Publication Data

US 2023/0405855 A1 Dec. 21, 2023

(51) Int. Cl.
*B26B 21/40* (2006.01)
*B26B 21/44* (2006.01)

(52) U.S. Cl.
CPC ........ *B26B 21/4093* (2013.01); *B26B 21/443* (2013.01)

(58) Field of Classification Search
CPC ... B26B 21/4093; B26B 21/443; B26B 21/40; G09B 1/00
See application file for complete search history.

(56) References Cited

U.S. PATENT DOCUMENTS

| | | | | |
|---|---|---|---|---|
| 9,390,631 | B2 * | 7/2016 | Romeu | B26B 21/4093 |
| 12,090,677 | B2 * | 9/2024 | Whitmore, IV | B26B 21/4093 |
| 2007/0124944 | A1 | 6/2007 | Thoene et al. | |
| 2014/0352154 | A1 * | 12/2014 | Ortins | B26B 21/4093 30/50 |
| 2015/0099258 | A1 | 4/2015 | Romeu | |
| 2018/0001492 | A1 | 1/2018 | Nicholas | |
| 2022/0009114 | A1 | 1/2022 | Schizas | |
| 2022/0088812 | A1 | 3/2022 | Hunwick | |
| 2023/0398706 | A1 | 12/2023 | Whitmore, IV | |

FOREIGN PATENT DOCUMENTS

| | | | |
|---|---|---|---|
| EP | 2570796 | A1 | 3/2013 |
| RU | 2623980 | C1 | 6/2017 |
| WO | 2014197434 | A1 | 12/2014 |
| WO | 2015054019 | A1 | 4/2015 |

OTHER PUBLICATIONS

16254 PCT Search Report and Written Opinion for PCT/US2023/024647 dated Sep. 25, 2023; 10 pages.

* cited by examiner

*Primary Examiner* — Octavia Hollington
(74) *Attorney, Agent, or Firm* — John M. Lipchitz

(57) ABSTRACT

A shaving demonstration method may involve providing at least a first shaving razor having a first shaving surface with a first lubrication member; exposing the first lubrication member to a composition of water and a fluorescent dye; engaging at least a first sheet of paper with at least the first lubrication member; causing relative motion between the first lubrication member and the first sheet of paper; and exposing the first sheet of paper to a light source.

20 Claims, 10 Drawing Sheets

SHAVING RAZOR DEMONSTRATION METHOD

FIELD

The present disclosure relates generally to demonstration of shaving razors and more specifically to demonstration of lubricating members of shaving razors.

BACKGROUND

Consumers of disposable and system shaving razors (i.e., razor handles having a replaceable razor cartridge) continue to demand improved product performance. As a result, razor manufacturers continually try to improve upon various shaving razor performance attributes that are desired by consumers. However, even when a better shaving razor is designed and manufactured, razor manufacturing companies, advertisers and retailers face difficulty in communicating to the consumers, especially in a meaningful, clear, and visual manner, that a particular shaving razor product demonstrates improved or more effective performance, for example closeness, fewer missed hairs or comfort, increased glide (i.e., lubrication), moisturization, or other benefits compared to other shaving razor products.

Accordingly, there is a need for an apparatus and/or a method for demonstrating to consumers particular advantages of using certain shaving razors. There is also a need for a method to demonstrate performance differences between shaving razors (such as increased lubrication or moisturization and/or components that release lubrication and/or moisturization in front of the blades) and to communicate these differences to consumers clearly.

The discussion of shortcomings and needs existing in the field prior to the present disclosure is in no way an admission that such shortcomings and needs were recognized by those skilled in the art prior to the present disclosure.

SUMMARY

Various embodiments relate to a shaving demonstration method that may comprise providing at least a first shaving razor having a first shaving surface with a first lubrication member. The method may then comprise exposing the first lubrication member to a composition of water and a fluorescent dye. Next, the method may comprise engaging at least a first sheet of paper with at least the first lubrication member and causing relative motion between the first lubrication member and the first sheet of paper. Finally, the method may comprise exposing the first sheet of paper to a light source, which may cause a lubrication pattern to fluoresce to provide a clear visual demonstration of the effectiveness of the first lubrication member at a smooth and continuous application of a shaving aid. A single shaving razor may be demonstrated, or multiple shaving razors may be demonstrated simultaneously. For example, according to various embodiments, the method may further comprise providing a second shaving razor having a second shaving surface with a second lubrication member and exposing the second lubrication member to the composition. The method may then comprise engaging the first sheet of paper with the second lubrication member and causing relative motion between the second lubrication member and the first sheet of paper.

Other embodiments relate to a shaving demonstration apparatus comprising a first sheet of paper, a liquid composition, a first shaving razor having a first shaving surface with a first lubrication member, and a light source transmitting ultraviolet light onto the first sheet of paper. The first shaving razor may have a first position with the first lubrication member depositing the liquid composition onto the first sheet of paper and a second position with the first lubrication member positioned within a first tank that contain the liquid composition. The shaving demonstration apparatus may further comprise a second shaving razor having a second shaving surface with a second lubrication member. The second shaving razor may have a first position with the second lubrication member depositing the liquid composition onto the first sheet of paper. Alternatively, the shaving demonstration apparatus may comprise a second sheet of paper and a second shaving razor having a second shaving surface with a second lubrication member. The second shaving razor may have a first position with the second lubrication member depositing the liquid composition onto the second sheet of paper and a second position with the second lubrication member positioned within the second tank. The second shaving razor may also have a second position with the second lubrication member positioned within the first tank.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

Figure 1A:
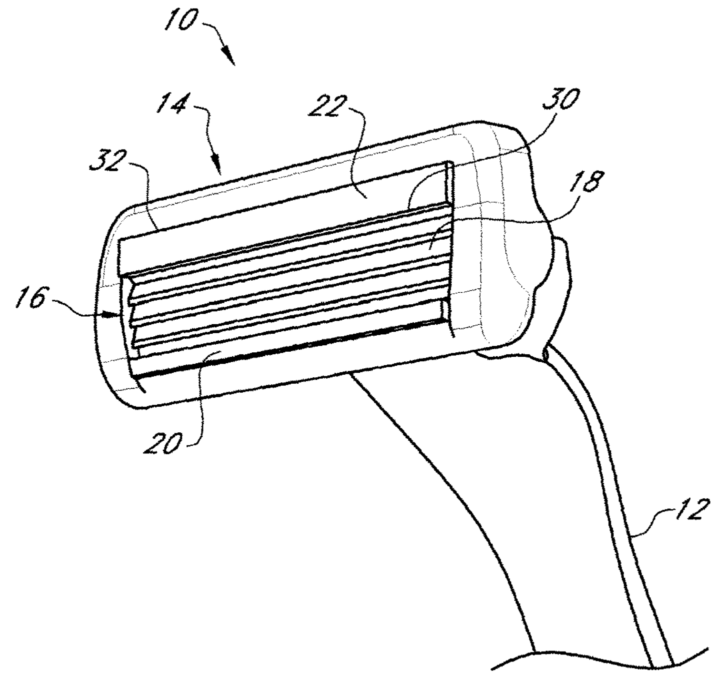
FIG. 1A is an example according to various embodiments illustrating a perspective front view of a first shaving razor.

It should be understood that the various embodiments are not limited to the examples illustrated in the figures.

DETAILED DESCRIPTION

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

In this specification and in the claims that follow, reference will be made to a number of terms that shall be defined to have the following meanings unless a contrary intention is apparent.

As used herein, the term "standard temperature and pressure" generally refers to 25° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high-temperatures" generally refer to temperatures of at least 100° C.

Unless otherwise specified, all percentages indicating the amount of a component in a composition represent a percent by weight of the component based on the total weight of the composition. The term "mol percent" or "mole percent" generally refers to the percentage that the moles of a particular component are of the total moles that are in a mixture. The sum of the mole fractions for each component in a solution is equal to 1.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As used herein, the term "mixing" refers to a unit operation in industrial process engineering that involves manipulation of a heterogeneous physical system with the intent to make it more homogeneous. Mixing is performed to allow heat and/or mass transfer to occur between one or more streams, components, or phases.

As used herein, the term "disposed on" refers to a positional state indicating that one object or material is arranged in a position adjacent to the position of another object or material. The term does not require or exclude the presence of intervening objects, materials, or layers.

FIG. 1A is an example according to various embodiments illustrating a perspective front view of a first shaving razor 10. Various embodiments relate to a shaving demonstration method or a shaving lubrication demonstration. The methods may comprise providing a first shaving razor 10 having a first shaving surface 16 with a first lubrication member 22, as shown in FIG. 1A. The first shaving razor 10 may also include a first handle 12 having a first blade cartridge unit 14. The first blade cartridge unit 14 may comprise the first shaving surface 16 and at least one blade 18 for shaving hair as well as the first lubrication member 22 positioned behind the at least one blade 18. As shown in FIG. 1A, the first blade cartridge unit 14 may further comprise a supplemental lubrication member 20, positioned in front of the at least one blade 18. The supplemental lubrication member 20 is optional and the first razor 10 need not include the supplemental lubrication member 20. The first lubrication member 22 may have a first leading edge 30 and a first trailing edge 32.

Figure 1B:
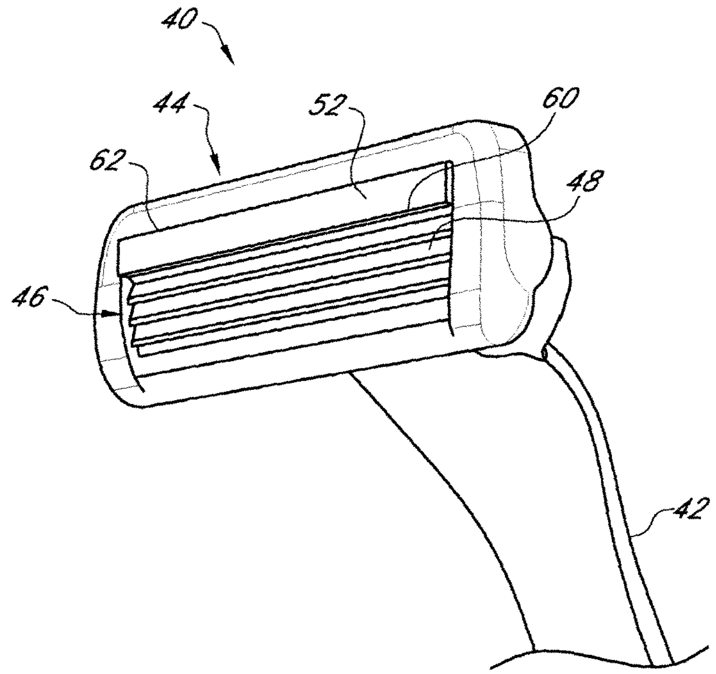
FIG. 1B is an example according to various embodiments illustrating a perspective front view of a second shaving razor.

FIG. 1B is an example according to various embodiments illustrating a perspective front view of a second shaving razor 40. Some embodiments of the shaving demonstration method may facilitate a comparison of the first shaving razor 10, to the second shaving razor 40. The second shaving razor 40 may be structurally similar to the first shaving razor 10. The method may, therefore, further comprise providing a second shaving razor 40 having a second shaving surface 46 with a second lubrication member 52, as shown in FIG. 1B. The second shaving razor 40 may also include a second handle 42 having a second blade cartridge unit 44. The second blade cartridge unit 44 may comprise the second shaving surface 46 and at least one blade 48 for shaving hair, as well as the second lubrication member 42 positioned behind the at least one blade 48. The second razor 40 illustrated in FIG. 1B does not include a supplemental lubrication member 20, but it is to be appreciated that the second razor 40 may include a supplemental lubrication member 20 as illustrated in FIG. 1B. The second lubrication member 52 may have a second leading edge 60 and a second trailing edge 62.

Still referring to FIGS. 1A and 1B, it is to be understood that the blade 18 or the blade 48 may be any type of cutting member. For example, the blade 18 or the blade 48 may include a cutting member of an electric razor or trimmer Variations in the positions and numbers of blades are contemplated. The lubrication members may have any suitable shape. As shown, the lubrication members 22, 52 are rectangular bars, but other shapes such as cylinders or prisms are contemplated. Each lubrication member 22, 52 need not be unitary, but may be formed from a plurality of subunits, such as an array of smaller lubrication members.

Figure 2A:
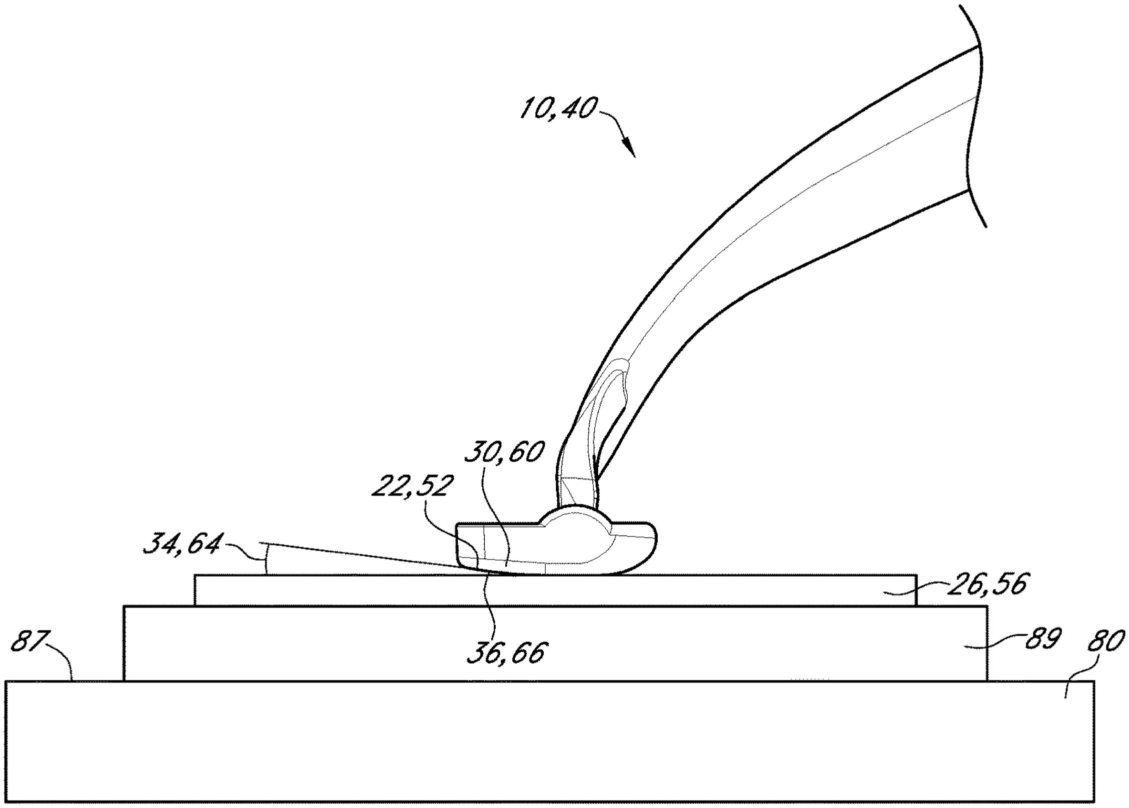
FIG. 2A is an example according to various embodiments illustrating a perspective side view of a shaving razor engaging a sheet of paper.
Figure 2B:
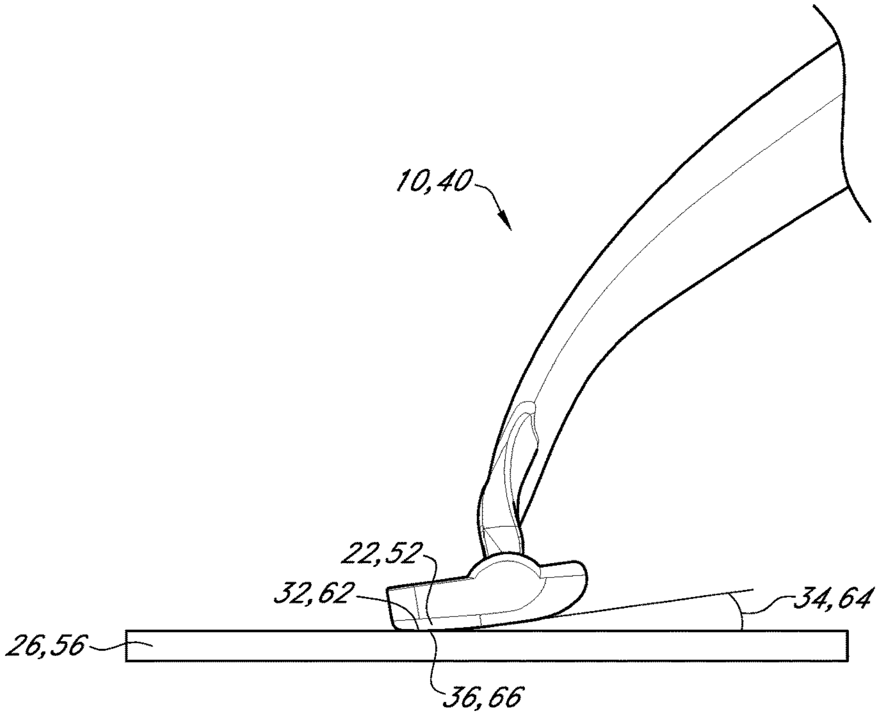
FIG. 2B is an example according to various embodiments illustrating a perspective side view of a shaving razor engaging a sheet of paper.

Referring to FIGS. 2A and 2B, various embodiments relate to engaging a markable substrate, like a sheet of paper 26, 56, with the lubrication member(s) 22, 52 of a shaving razor. To ensure good contact between the lubrication member 22, 52 and the sheet of paper 26, 56, a contact angle 34, 64 between the lubrication member 22, 52 and the sheet of paper 26, 56 may be maintained. FIGS. 2A and 2B are examples according to various embodiments illustrating a perspective side view of a first shaving razor 10 engaging a first sheet of paper 26 at a first contact angle 34 or a second shaving razor 40 engaging a second sheet of paper 56 at a second contact angle 64. For example, when engaging the first sheet of paper 26 with the first lubrication member 22, the first lubrication member 22 and the first sheet of paper 26 may define a first contact angle 34 having a first vertex 36 on the first leading edge 30, as shown in FIG. 2A, or on the first trailing edge 32, as shown in FIG. 2B. The first contact angle 34 may be in a range of from about 0 to about 5 degrees, or from about 0.5 to about 4.5 degrees, or from about 1 to about 4 degrees, or from about 2 to about 3 degrees. Similarly, when engaging the first sheet of paper 26 or the second sheet of paper 56 with the second lubrication member 52 after the exposing the second lubrication member 52 to the composition 24, the second lubrication member 52 and the first sheet of paper 26 or the second sheet of paper 56 may define a second contact angle 64 having a second vertex 66 on the second leading edge 60 or on the second trailing edge 62. The second contact angle 64 may be in a range of from about 0 to about 5 degrees, or from about 0.5 to about 4.5 degrees, or from about 1 to about 4 degrees, or from about 2 to about 3 degrees.

As shown in FIG. 2A, the sheet of paper 26, 56 may be disposed on a support structure 80, having a top surface 87 upon which the paper rests. An optional spacer 89 may be placed on the top surface 87 to aid with ensuring the desired contact angle 34, 64. The spacer 89 may be permanent or removable. For example, the spacer 89 may be a rectangular piece of plastic about 1 inch (about 25.4 mm) wide by about 2 inches (about 50.8 mm) in length, having a height of about 0.25 inches (about 6.35 mm) that may be placed or glued on the surface 87 of the support structure 80. The sheet of paper 26, 56 and then the razor 10, 40 may rest upon the spacer 89 to ensure a complete and even surface contact across the length of the lubrication member(s) 22, 52. Although only illustrated in FIG. 2A, it is to be appreciated that the spacer 89 may be added to any embodiment. The top surface 87, or any spacer 89 disposed thereon, may have a coefficient of friction suitable to allow the paper 26, 56 to slide without excessive resistance. The top surface 87, or any spacer 89 disposed thereon, may comprise any suitable material, such as a plastic material or a metal. An acrylic sheet, such as PLEXIGLASS®, may be suitable. The relative motion should be caused to ensure that the height of the paper 26, 56 relative to the top surface 87 remains approximately constant throughout the demonstration to ensure that the contact angle between the razor 10, 40 and the paper 26, 56 is not altered, which could cause less than the entire surface of a lubrication member 26, 56 to engage the paper 26.

It is understood that some shaving cartridges 14, 44 may have a rounded or arched profile. In such cases, it may not be possible to test any supplemental lubrication member 20 simultaneously with the main lubrication member 22, 52, because of how the shaving cartridge 14, 44 may contact a surface. The method may, therefore, comprise selecting a contact angle 34, 64 that provides good contact with a particular lubrication member 22, 52, such as the main lubrication member 22, 52 as opposed to any supplemental lubrication member 20. It may be beneficial to select the lubrication member 22, 52 that releases the most shaving aid.

Methods demonstrating the first shaving razor 10 or comparing the first shaving razor 10 to one or more other shaving razors, such as the second shaving razor 40, may provide a visual demonstration of the effectiveness of the lubrication member(s) 20, 22, 52 of each razor. The lubrication members 20, 22, 52 may deliver a shaving aid to a user's skin. The shaving aid may provide consumers one or more skin benefits such as moisturization, reduced irritation during shaving, cooling, heat, anti-acne, or sun protection. According to various embodiments, the shaving aid from a supplemental lubrication member 20 may cover or be deposited onto skin as well as onto the at least one blade 18, 48 during a shaving stroke. The shaving aid from the first lubrication member 22 or the second lubrication member 52 may be delivered or deposited primarily to the skin at the end of a shaving stroke but may also deposit shaving aid onto the at least one blade 18, 48 during subsequent or overlapping shaving strokes. The shaving aid of any of the lubrication members 20, 22, 52 may be the same or different. According to various embodiments, any or all of the lubrication members 20, 22, 52 may be a molded or extruded lubricating component, a gel reservoir, and/or a shaving aid dispensing member. The various methods may provide a visual demonstration of how a lubrication member 20, 22, 52 of a shaving razor 10, 40 deposits a liquid composition onto a surface, such as a sheet of paper 26, 56, which may be analogous to how the shaving razor 10, 40 deposits a shaving aid onto a surface of a user's skin.

In addition to providing a first shaving razor 10 having a first shaving surface 16 with the first lubrication member 22, shaving demonstration methods according to various embodiments may comprise exposing the first lubrication member 22 to a composition 24 comprising water and an indicator composition. The composition 24 may be prepared by mixing the components thereof. The composition 24 may comprise water in an amount of from about 95% by weight to about 99% by weight, or from about 96% by weight to about 98% by weight. The remainder of the composition 24 may comprise the indicator composition.

Figure 7A:
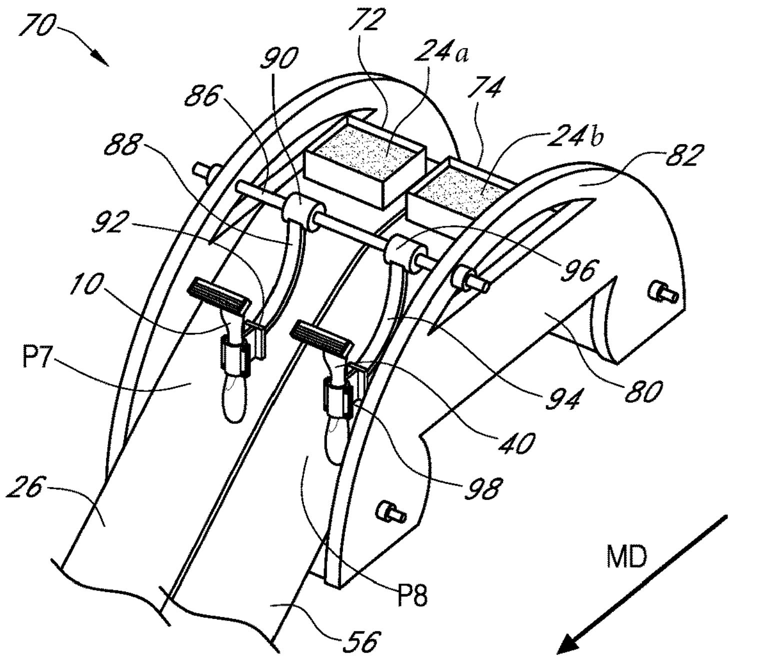
FIG. 7A is an example according to various embodiments illustrating a perspective side view of a shaving razor demonstration apparatus in a first configuration.

In general, the indicator composition of the composition 24 should be water soluble. The indicator composition of the composition 24 may comprise a fluorescent dye, or more specifically an ultraviolet fluorescent dye. A fluorescent dye exhibits fluorescence. As used herein, "fluorescence" is the emission of light by a substance that has absorbed light or other electromagnetic radiation. For example, a fluorescent dye may absorb light of a certain color and emit light of a different color, typically with a longer wavelength. When exposed to ultraviolet radiation, an ultraviolet fluorescent dye becomes fluorescent, giving off visible light. The indicator composition of the composition 24 may comprise pyranine, such as a pyrene dye like solvent green 7, which is often used in yellow highlighters. Pyranine is a hydrophilic, pH-sensitive fluorescent dye from the group of chemicals known as arylsulfonates. The indicator composition of the composition 24 may comprise a triarylmethane dye. For example, the indicator composition of the composition 24 may comprise a triphenylmethane dye, such as Acid Blue 9, which is often used in blue highlighters. A triphenylmethane dye includes any member of a group of synthetic organic, water soluble dyes having molecular structures based upon that of the hydrocarbon triphenylmethane. Another example of a triarylmethane dye is a rhodamine dye. The indicator may comprise a rhodamine dye, such as solvent red 49, which is often used in pink highlighters. Rhodamine refers to a family of related dyes, a subset of the triarylmethane dyes. Rhodamines may be derivatives of xanthene. The indicator composition of the composition 24 may comprise a xanthene dye, such as basonyl red 485. Xanthene dye refers to all dyes that contain a xanthene core, including fluorescein, eosins, and rhodamines. Xanthene dyes tend to be fluorescent, yellow to pink to bluish red, brilliant dyes. The indicator composition of the composition 24 may comprise coumarin dye, such as and basic yellow 40. A coumarin dye includes any water-soluble dye having a molecular structure based on coumarin. A combination of basonyl red 485 and basic yellow 40 is often used in orange highlighters. The specific examples given are not intended to be limiting. Any suitable indicator composition may be used in the composition 24. The indicator composition of the composition 24 may comprise any combination of the above-mentioned examples, as well as any other suitable dye or indicator. The indicator composition of the composition 24 need not always be fluorescent or comprise a fluorescent compound. For example, the indicator composition of the composition 24 may comprise food coloring or other compound as long as it aids in visualizing the liquid deposited therefrom. It is to be appreciated that different compositions 24 may be employed to distinguish between each razor that is demonstrated. For example as illustrated in FIG. 7A, a first composition 24*a* and a second composition 24*b* may be used. The first composition 24*a* may have a different composition than the second composition 24*b*. For example, unique dyes, having different colors, for each razor 10, 40 may be used to easily distinguish between different cartridges.

Referring to FIGS. 3A-3D, the method according to various embodiments, may comprise engaging a first sheet of paper 26 with the first lubrication member 22 (not visible in FIG. 3A-3D, See: FIG. 1) after exposing the first lubrication member 22 to the composition 24. After engaging the first sheet of paper 26 with the first lubrication member 22, the method may comprise causing relative motion between the first lubrication member 22 and the first sheet of paper 26. Finally, the method may comprise exposing the first sheet of paper 26 to a light source 28. It is to be appreciated that the step of exposing the first sheet of paper 26 to a light source 28 may be conducted during or after causing relative motion between the first lubrication member 22 and the first sheet of paper 26. The light source 28 may substantially emit light 29 having a wavelength within the ultraviolet spectrum range, for example, from about 100 to about 400 nm or more specifically within a range of from about 320 to about 400 nm.

Figure 3A:
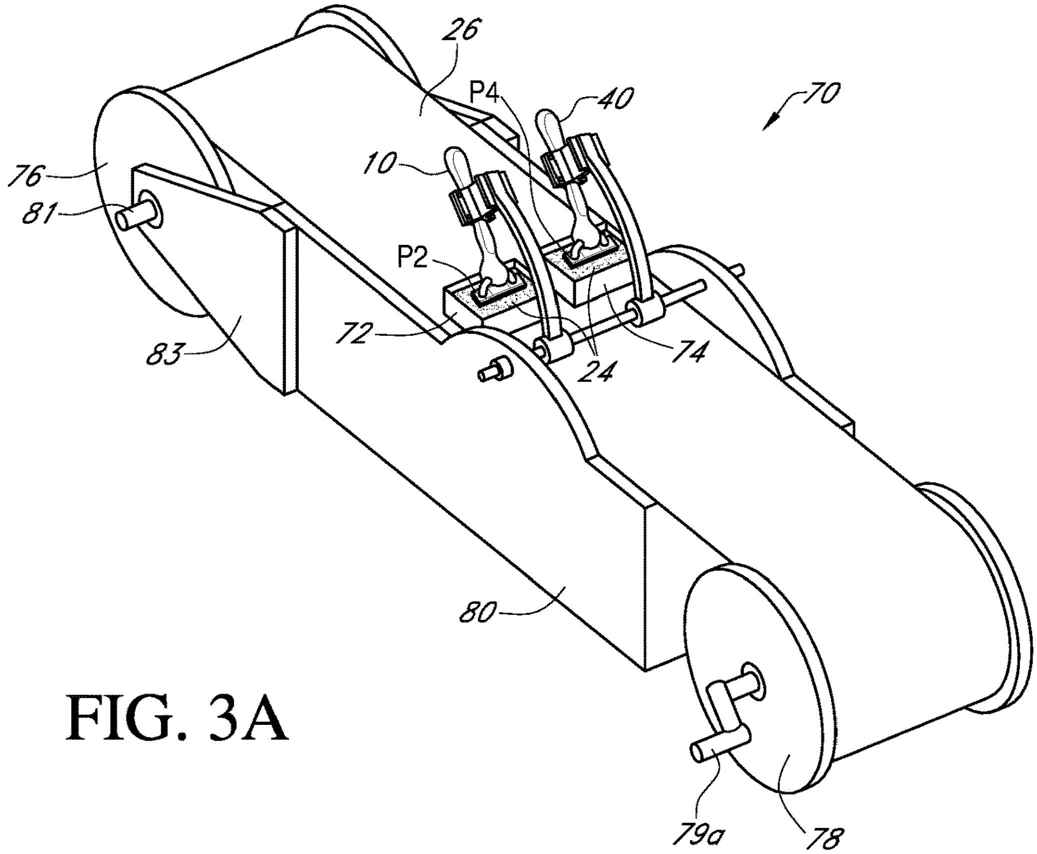
FIG. 3A is an example according to various embodiments illustrating a perspective side view of a shaving razor demonstration apparatus and method employing a single sheet of paper in a first configuration.
Figure 3B:
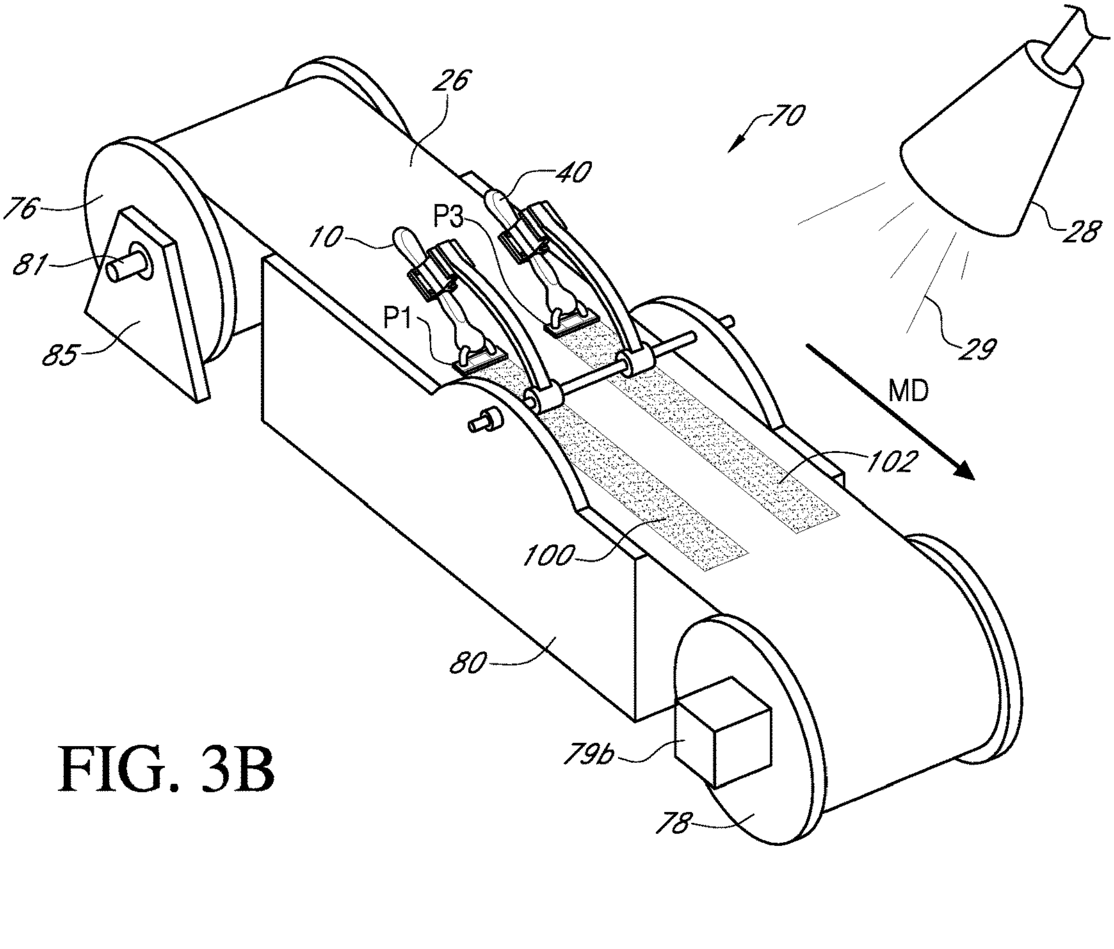
FIG. 3B is an example according to various embodiments illustrating a perspective side view of the shaving razor demonstration apparatus and method of FIG. 3A in a second configuration.

Still referring to FIG. 3B, the first lubrication member 22 of the first shaving razor 10 may deposit liquid, comprising the composition 24 of water and an indicator composition, in a first lubrication pattern 100 on the first sheet of paper 26. Since water causes shaving aid to leach out of the lubrication member(s) 22, 52, the deposited liquid may comprise not only the composition 24, but also a shaving aid. The first lubrication pattern 100 may fluoresce in response to exposure to light 29 from a light source 28. As used herein, "fluoresce" means shine or glow brightly due to fluorescence. As discussed, the light 29 may be ultraviolet light. According to various embodiments it may be beneficial to reduce or to eliminate other light, for example by conducting the demonstration method in a room that is dark except for the light 29.

The step of causing relative motion between the first lubrication member 22 and the first sheet of paper 26 after engaging the first sheet of paper 26 with the first lubrication member 22 of the first shaving razor 10 is illustrated in FIG. 3B. Causing the relative motion may be achieved by moving either the first sheet of paper 26, the first shaving razor 10, or both. The motion may be along an approximately straight path in approximately a single direction. For example, as shown in FIG. 3B, the first sheet of paper 26 may be rolled from a first feeder roll 76 across a paper supporting structure 80 and onto a first acceptor roll 78 in a machine direction MD. The first accepter roll 78 may be wound about an axis, for example by a conveyor mechanism. The conveyor mechanism may be a hand crank 79*a* as shown in FIG. 3A or a motor 79*b* as shown in FIG. 3B. It is to be appreciated that an acceptor roll 78 is optional. The paper 26 may alternatively be pulled by hand and not wound around an acceptor roll 78. In either case, the relative motion between the first lubrication member 22 and the first sheet of paper 26 should occur steadily and may occur at a predetermined rate.

For embodiments, in which multiple shaving razors 10, 40 are being demonstrated, the speed of the relative motion between the razors 10, 40 and the paper(s) 26, 56 with which they engage should be about the same to ensure an even distribution of the composition 24 across the paper(s) 26, 56. The rate may be selected to ensure that the demonstration provides adequate time for an observer to appreciate the differences between the razors 10, 40 tested and/or to appreciate the quality of the lubrication pattern deposited by a given razor 10, 40. If the relative motion is too fast, the paper(s) 26, 56 may not show an even distribution of the composition 24. On the other hand, if the relative motion is too slow, the composition 24 has more time to absorb into the paper(s) 26, 56 and may cause a tear. According to various embodiments, relative motion between the first lubrication member 22 and the first sheet of paper 26 may occur at a rate of about 1 inch (about 25.4 mm) per second to about 5 inches (about 127 mm) per second, or about 2 inches (about 50.8 mm) per second to about 4 inches (about 101.6 mm) per second. For example, the first sheet of paper 26 may be wound about the first accepter roll 78 or otherwise pulled across the supporting structure 80 in the machine direction MD at that rate.

A single shaving razor 10 may be demonstrated, or multiple shaving razors 10, 40 may be demonstrated simultaneously. For example, according to various embodiments, the method may further comprise providing the second shaving razor 40 having a second shaving surface 46 with the second lubrication member 52; exposing the second lubrication member 52 to the composition 24; engaging the first sheet of paper 26 with the second lubrication member 52 after the exposing the second lubrication member 52 to the composition 24; and causing relative motion between the second lubrication member 52 and the first sheet of paper 26 after said engaging the first sheet of paper 26 with the second lubrication member 52. The step of exposing the second lubrication member 52 to the composition 24 is illustrated in FIG. 3A. The step of causing relative motion between the second lubrication member 52 and the first sheet of paper 26 is illustrated in FIG. 3B. Just like the first lubrication member 22 of the first shaving razor 10, the second lubrication member 52 of the second shaving razor 40 may deposit liquid, comprising the composition 24 of water and an indicator composition, in a second lubrication pattern 102 on the first sheet of paper 26. The second lubrication pattern 102 may fluoresce in response to exposure to light 29 from the light source 28. The relative motion between the second lubrication member 52 and the first sheet of paper 26 may occur at the same rate as the relative motion between the first lubrication member 22 and the first sheet of paper 26.

Figure 3C:
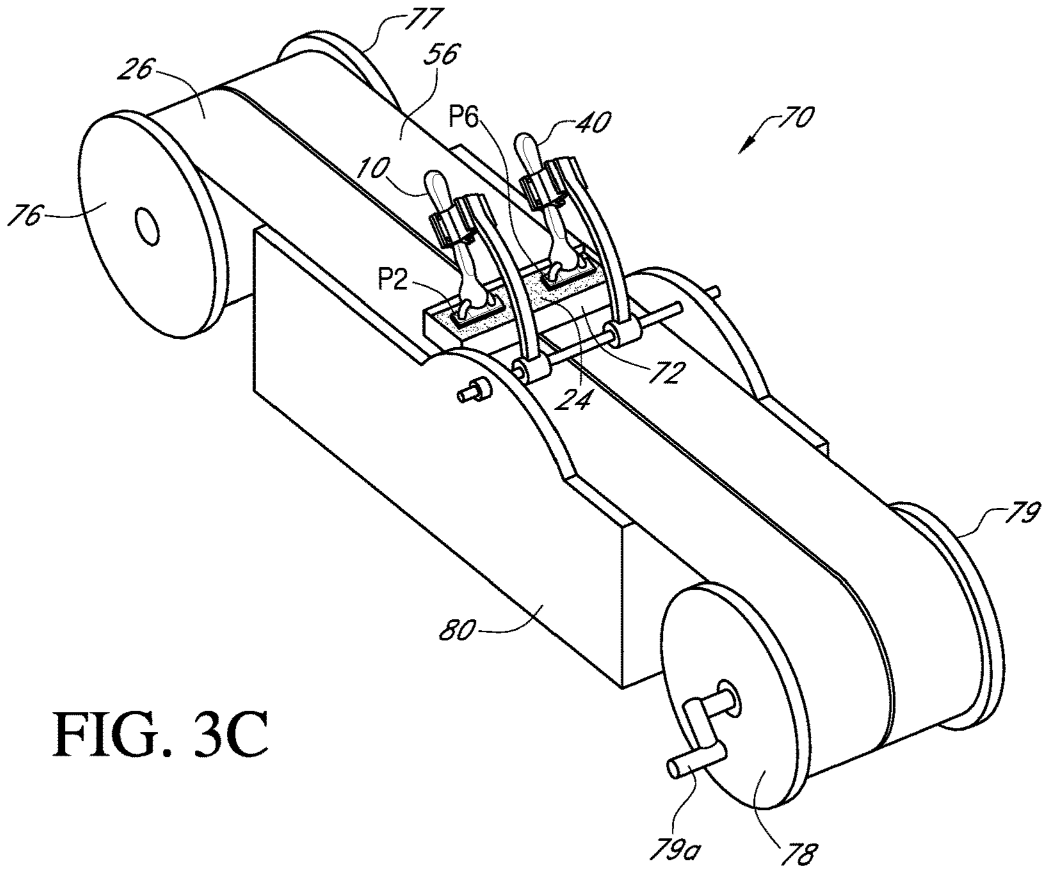
FIG. 3C is an example according to various embodiments illustrating a perspective side view of a shaving razor demonstration apparatus and method employing multiple sheets of paper in a first configuration.
Figure 3D:
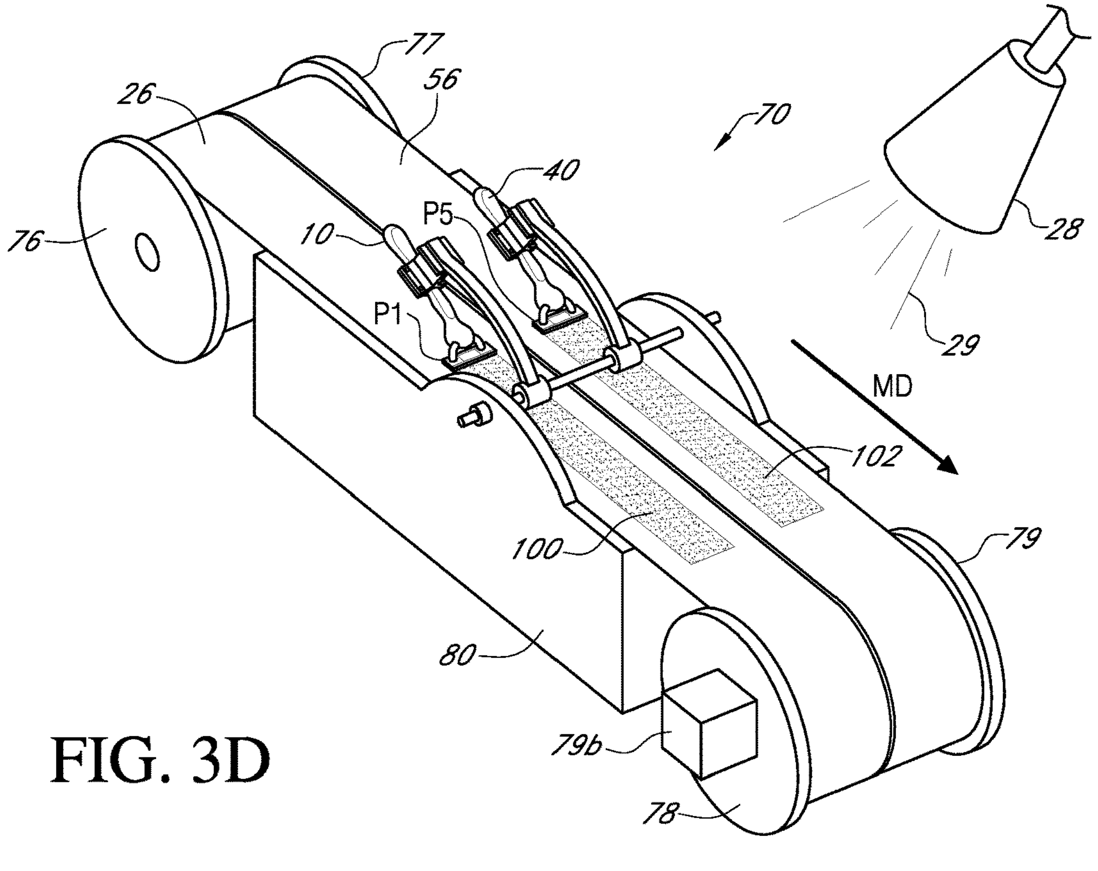
FIG. 3D is an example according to various embodiments illustrating a perspective side view of the shaving razor demonstration apparatus and method of FIG. 3C in a second configuration.

Any number of razors 10, 40 and any number of sheets of paper 26, 56 may be employed simultaneously. The relative motion between the razors 10, 40 and their respective sheets of paper 26, 56 may be the same or different. FIGS. 3C-3D illustrate an embodiment that employs multiple sheets of paper 26, 56. As shown, the method may comprise providing a second shaving razor 40 having a second shaving surface 46 with a second lubrication member 52; exposing the second lubrication member 52 to the composition 24; engaging a second sheet of paper 56 with the second lubrication member 52 after the exposing the second lubrication member 52 to the composition 24; causing relative motion between the second lubrication member 52 and the second sheet of paper 56 after the engaging the second sheet of paper 56 with the second lubrication member 52; and exposing the second sheet of paper 56 to the light source 28. As in other embodiments, the second lubrication pattern 102 may fluoresce in response to exposure to light 29 from the light source 28. The relative motion between the second lubrication member 52 and the second sheet of paper 56 may occur at a rate of about 1 inch (about 25.4 mm) per second to about 5 inches (about 127 mm) per second, or about 2 inches (about 50.8 mm) per second to about 4 inches (about 101.6 mm) per second.

According to various embodiments, the exposing the first lubrication member 22 and/or the second lubrication member 52 to the composition 24 may comprise dipping the first lubrication member 22 and/or the second lubrication member 52 into the composition 24. The composition 24 may be held in one or more tanks 72, 74. For example, the first lubrication member 22 and the second lubrication member 52 may both be dipped into a first tank 72 containing the composition 24. Alternatively, the first lubrication member 22 may be dipped into the first tank 72 containing a first portion of the composition 24 and the second lubrication member 52 may be dipped into a second tank 74 containing a second portion of the composition 24. The lubrication members 22, 52 may be dipped into the composition 24 for a time interval. The time interval may be the same or different for each lubrication member 22, 52. The time interval may be from about 1 to about 3 minutes, or from 90 seconds to about 2 minutes. The time interval may represent typical consumer shaving habits of running a shaving razor 10, 40 under the faucet or shower head prior to taking a first shaving stroke. If the time interval is too long, lubricants from the lubrication members 22, 52 may leach into the water and alter the state of the lubrication member 22, 52, which may not provide a good demonstration of the lubrication member 22, 52 under ordinary use circumstances. It is understood several time intervals may be tried before finding the optimal time interval. According to various embodiments the method may comprise dipping the first lubrication member 22 and/or the second lubrication member 52 into the composition 24 multiple times. Dipping the lubrication members 22, 52 multiple times may allow each lubrication member 22, 52 more time to absorb the composition 24 to which it was exposed. Absorption of the composition 24 through a lubrication member 22, 52 may proceed as a concentration gradient, with the composition 24 moving from an outer surface or layer toward an inner core or layer of the lubrication member 22, 52 over time. Continuously exposing only the outermost surface or layer of the lubrication member 22, 52 may deteriorate that surface or layer too much. A series of dips may allow the composition 24 to be more evenly distributed through the lubrication member 22, 52. According to various embodiments, the method may comprise dipping the lubrication members 22, 52 into the composition 24 for a first time interval, withdrawing the lubrication members 22, 52 from the composition 24 for a second time interval, and dipping the lubrication members 22, 52 into the composition 24 for a third time interval. The first time interval, the second time interval, and the third time interval may each be from about 1 to about 3 minutes, or from 90 seconds to about 2 minutes. According to various embodiments, the third time interval may be less than the first time interval.

The method according to various embodiments may repeated multiple times using the same razor 10 or razors 10, 40, such that the step of providing the razor(s) 10, 40 may be omitted on subsequent demonstrations. When a razor 10 or razors 10, 40 is reused, the step(s) of exposing the lubrication member(s) 22, 52 to the composition 24 may be done for a time interval of from about 10 seconds to about 60 seconds, or from 20 seconds to about 50 seconds, or from about 30 to about 40 seconds.

According to various embodiments, the method may comprise dulling, moving, or removing one or more blades 18, 48 from the first shaving razor 10 and/or the second shaving razor 40. This step may ensure that the blades 18, 48 do not engage the paper 26, 56, which could lead to cutting the paper and/or distorting the lubrication patterns 100, 102.

The first sheet of paper 26 and/or the second sheet of paper 56 may be thermal paper. Thermal paper is a type of paper that is typically coated with a material formulated to change color when exposed to heat. It is used in thermal printers, particularly in inexpensive or lightweight devices such as adding machines, cash registers, and credit card terminals for printing receipts. Thermal paper is advantageous because it does not absorb water as quickly as uncoated paper, providing an improved spread of composition 24 along the paper 26, 56 to produce clear lubrication patterns 100, 102. Any suitable paper may be employed. The paper 26, 56 must be able to absorb at least some of the composition, but, like thermal paper, may have one or more coating layers applied thereto. A completely water impermeable coating, such as a plastic sheet, would not show distribution of the composition 24 from the lubrication members 22, 52 as well.

Figure 4:
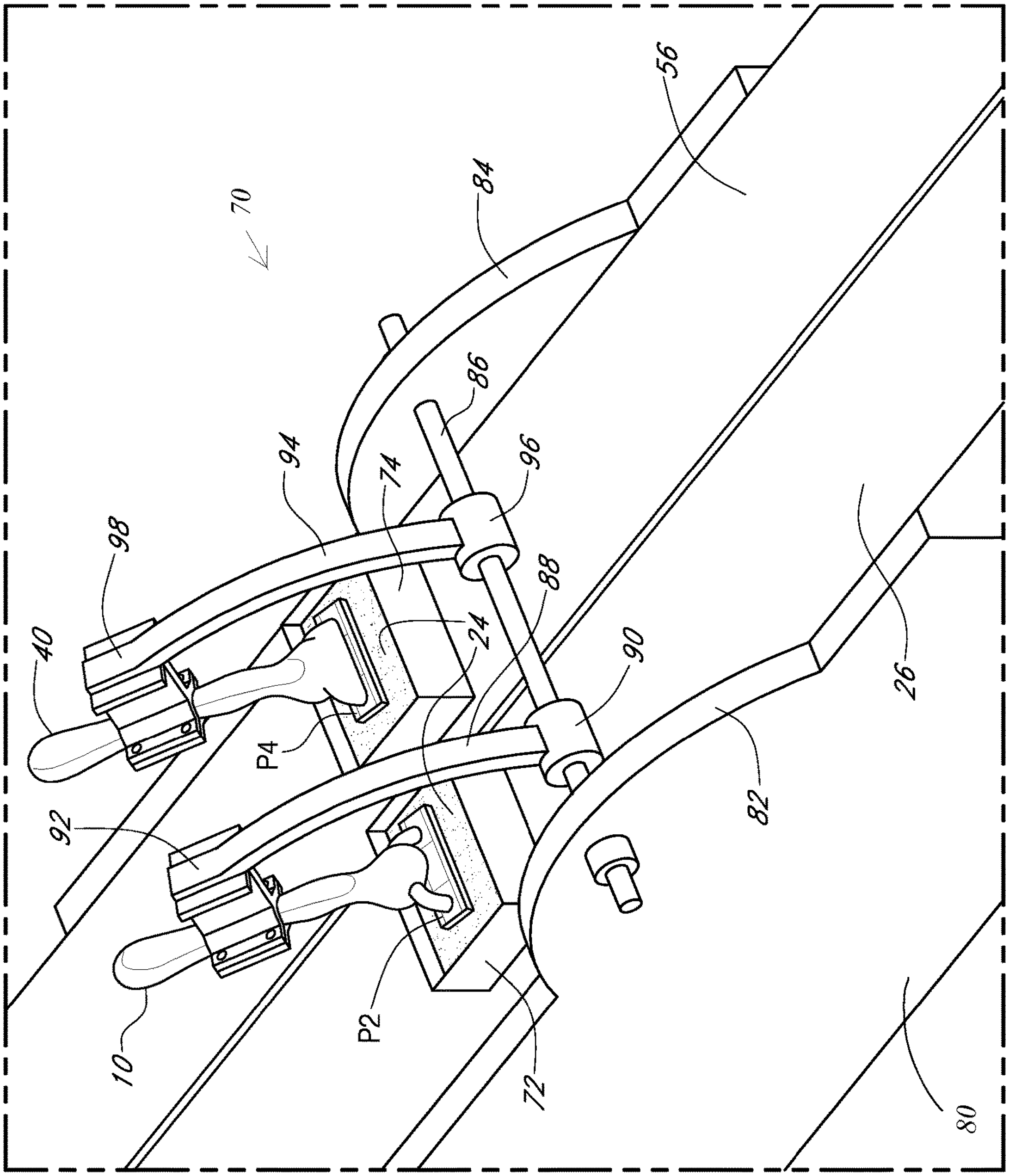
FIG. 4 is an example according to various embodiments illustrating an enlarged perspective side view of a shaving razor demonstration apparatus and method in a first configuration.

FIG. 4 is an example according to various embodiments illustrating an enlarged perspective side view of a shaving razor demonstration apparatus 70 and method 700 in a first configuration. The apparatus 70 may further comprise a support structure 80 on which the sheet(s) of paper 26, 56 may disposed. The support structure 80 may comprise a first sidewall 82 and a second side wall 84, as illustrated in FIG. 4. The first sidewall 82 and the second side wall 84 may support a crossbar 86. The crossbar 86 may be permanently or removably mounted. The crossbar 86 may be adjustable such that it may be tightened or loosened, for example via a hex pin or screw. When the crossbar 86 is tightened, it may be substantially immobilized such that it does not rotate. A first arm 88 may be pivotably mounted on the crossbar 86 via a first pivot 90. The first pivot 90 may be adjustable such that it may be tightened or loosened, for example via a hex pin or screw. When the first pivot 90 is tightened, it may be substantially immobilized such that it does not rotate about the crossbar 86. The first arm 88 may comprise a first adjustable razor grip 92 for gripping the first shaving razor 10 by the first handle 12. A second arm 94 may be pivotably mounted on the crossbar 86 via a second pivot 96. The second pivot 96 may be adjustable such that it may be tightened or loosened, for example via a hex pin or screw. When the second pivot 96 is tightened, it may be substantially immobilized such that it does not rotate about the crossbar 86. The second arm 94 may comprise a second adjustable razor grip 98 for gripping the second shaving razor 40 by the second handle 42.

Figure 5:
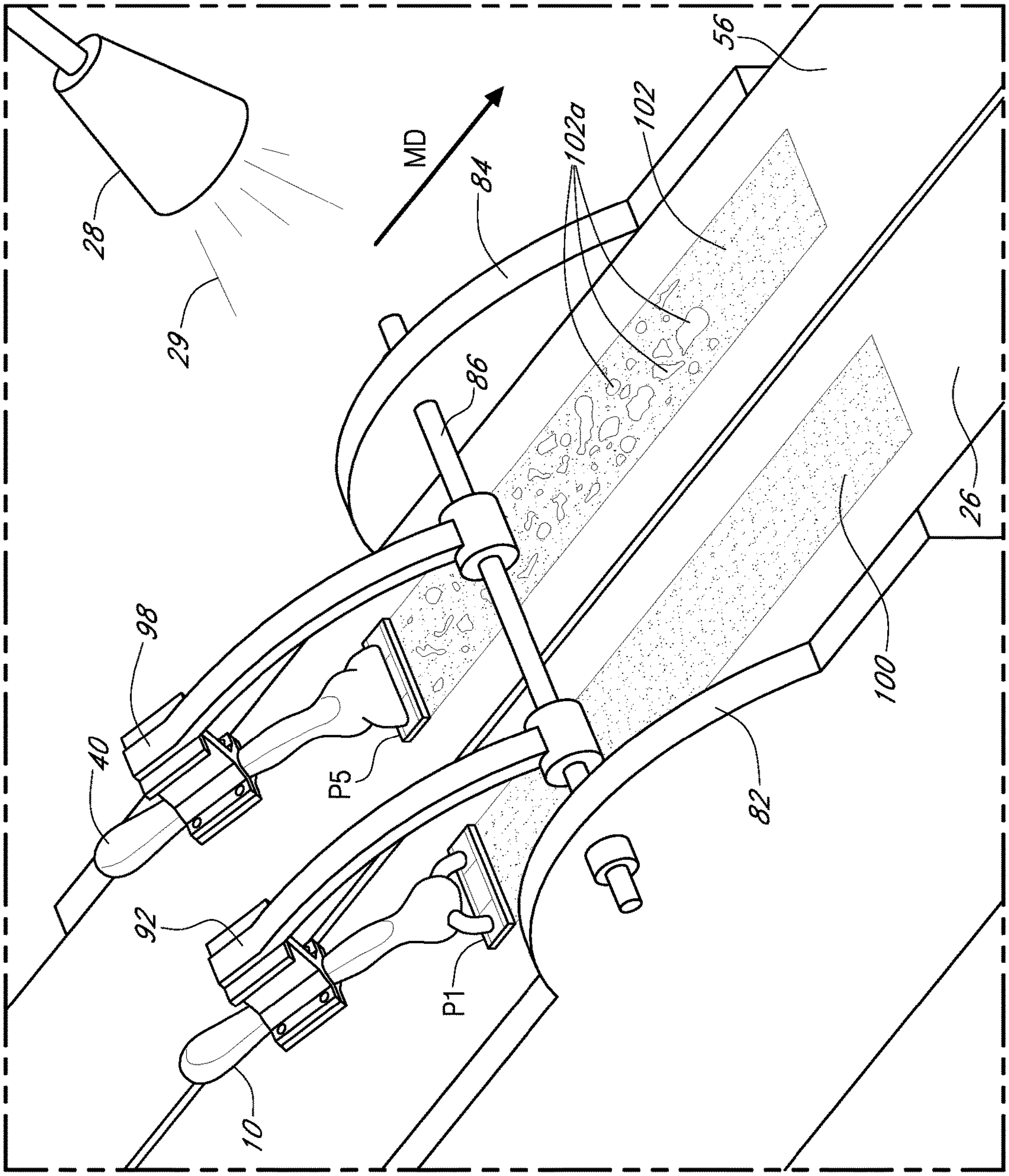
FIG. 5 is an example according to various embodiments illustrating an enlarged perspective side view of a shaving razor demonstration apparatus and method in a second configuration.
Figure 6:
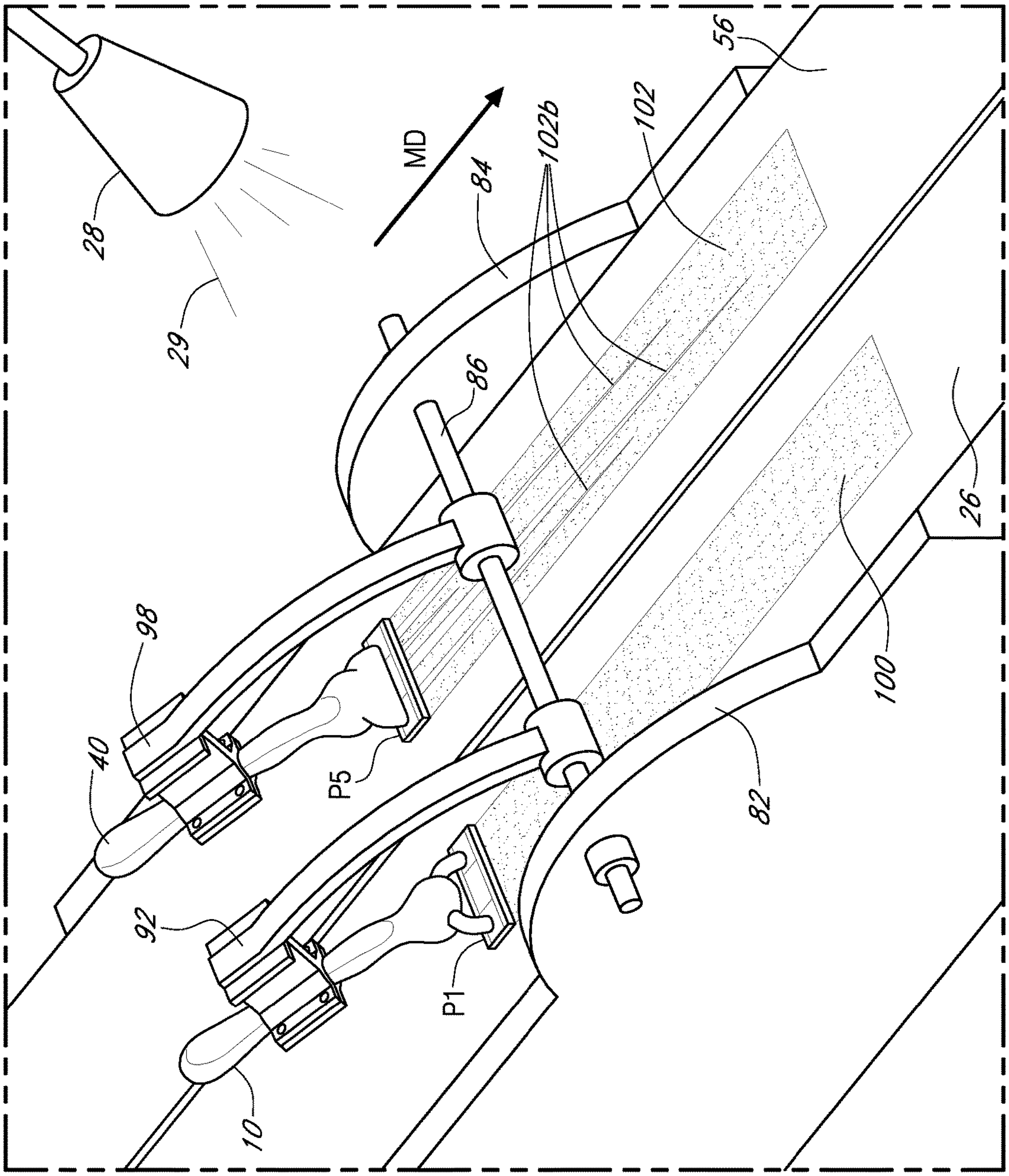
FIG. 6 is an example according to various embodiments illustrating an enlarged perspective side view of a shaving razor demonstration apparatus and method in a second configuration.

FIGS. 5 and 6 illustrate results that may be demonstrated by the methods according to various embodiments. The first lubrication pattern 100 deposited by the first lubrication member 22 of the first shaving razor 10 is smooth and consistent, evenly fluorescing under the light 29 from the light source 28. On the other hand, the second lubrication pattern 102 deposited by the second lubrication member 52 of the second shaving razor 40 is not smooth and consistent, but has a plurality of splotches 102*a*, as shown in FIG. 5, and/or streaks 102*b*, as shown in FIG. 6. The splotches 102*a* and streaks 102*b* are portions of the second sheet of paper 56 where the composition 24 has not been applied due to poor performance of the second lubrication member 52. The method may, therefore, provide a clearly visible demonstration of how effectively different lubrication members 22, 52 would deliver a liquid to a user's skin, which may be analogous to how effectively different lubrication members 22, 52 would deliver a shaving aid to a user's skin. The demonstration illustrates that some lubrication members 22, 52 may not deposit a smooth, consistent layer of shaving aid to provide consumers one or more skin benefits such as moisturization, reduced irritation during shaving, cooling, heat, anti-acne, or sun protection. Such distinctions between razors 10, 40 may not be visible or may only be poorly visible when using a razor 10, 40 to shave hair.

Figure 7B:
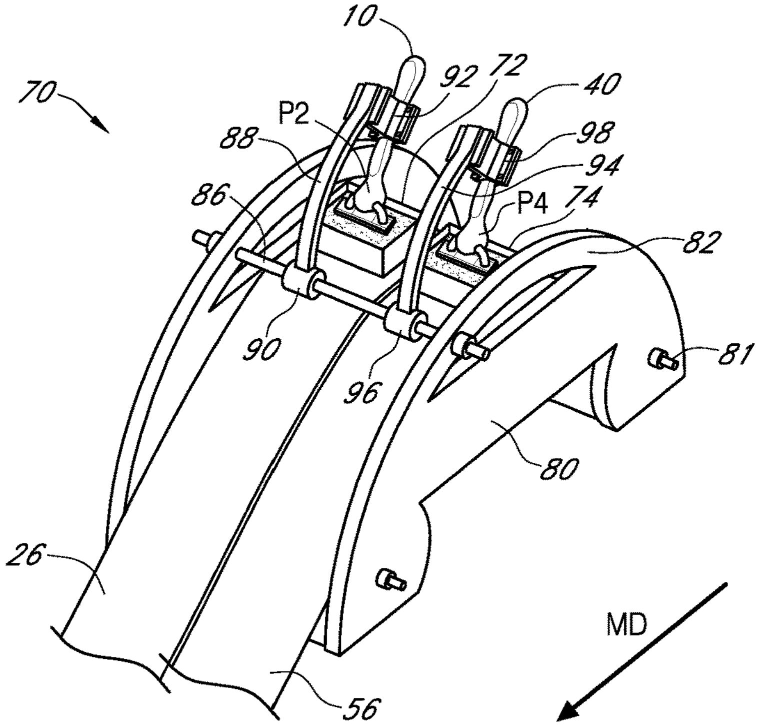
FIG. 7B is an example according to various embodiments illustrating a perspective side view of a shaving razor demonstration apparatus in a second configuration.
Figure 7C:
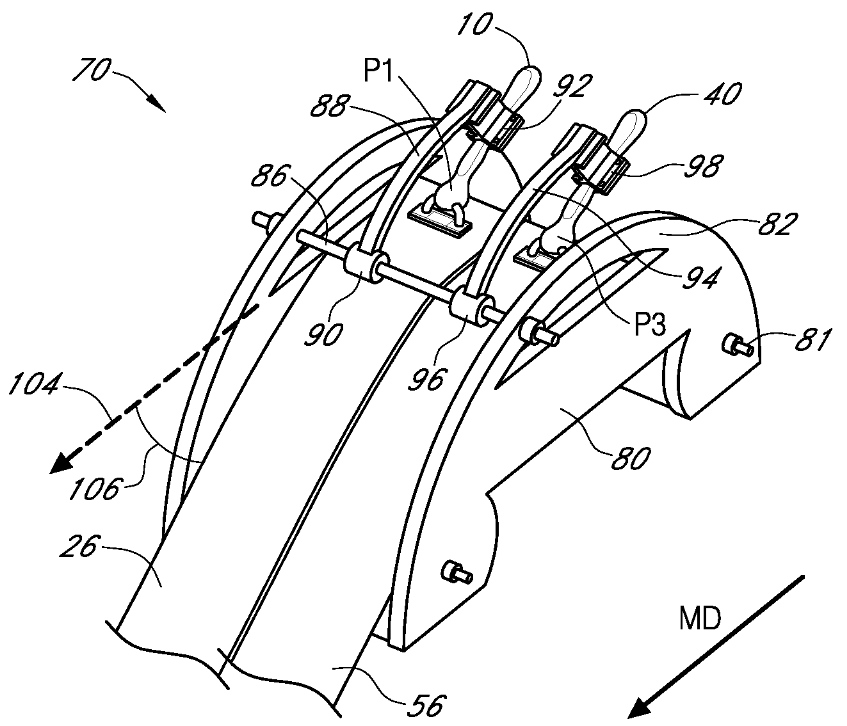
FIG. 7C is an example according to various embodiments illustrating a perspective side view of a shaving razor demonstration apparatus in a third configuration.

Various embodiments may further comprise quantifying the area of each lubrication pattern 100, 102 that is not smoothly and consistently covered with the composition 24. For example, the total area of each lubrication pattern 100, 102 may be compared to the total area occupied by splotches 102*a* and/or streaks 102*b*. Such a quantification may provide a degree of coverage, which may be specified as a percentage. For example, the first lubrication pattern 100 may have a first degree of coverage of about 90% to about 100%, meaning that the composition 24 covers about 90% to about 100% of the total area traversed by the first lubrication member 22 during the test. On the other hand, the second lubrication pattern 102 may have a second degree of coverage of about 50% to about 90%, meaning that the composition 24 covers only about 50% to about 90% of the total area traversed by the second lubrication member 52. FIGS. 7A, 7B, and 7C are examples according to various embodiments illustrating a perspective side view of a shaving razor demonstration apparatus 70.

FIGS. 7A, 7B, and 7C are examples according to various embodiments illustrating a perspective side view of a shaving razor demonstration apparatus 70 in a first, second, and third configuration, respectively. In FIG. 7A, the first shaving razor 10 is shown completely flipped into a position P7, such that it is rotated as far as possible away from the first tank 72. Similarly, the second shaving razor 40 is shown completely flipped into a position P8, such that it is rotated as far as possible away from the second tank 74. The first paper 26 and the second paper 56 are shown in a relaxed state. These positions may be beneficial to allow easier access to the tanks 72, 74. In FIG. 7B, the first razor 10 is shown in its second position P2, in which it is rotated into the first tank 72. The second razor 40 is shown in its second position P4, in which it is rotated into the second tank 74. Finally, in FIG. 7C, the first razor 10 is shown in its first position P1, engaging the first paper 26. The second razor 40 is shown in its first position P5, engaging the second paper 56. Again, the first paper 26 and the second paper 56 are shown in a relaxed state. When the paper 26 and 56 is pulled to cause relative motion between the razors 10, 40 in the machine direction MD, the papers 26, 56 may first be raised by an angle 106 and pulled along a path 104 that is approximately aligned with the positions of the first razor 10 and the second razor 40. As previously discussed, according to various embodiments and when testing various razors 10, 40, it may be beneficial to ensure that the height of the paper 26, 56 relative to the top surface 87 of the support 80 remains approximately constant throughout the demonstration to ensure that the contact angle between the razor 10, 40 and the paper 26, 56 is not altered, which may cause less than the entire surface of the lubrication member 22, 52 to engage the paper 26, 56.

Figure 8:
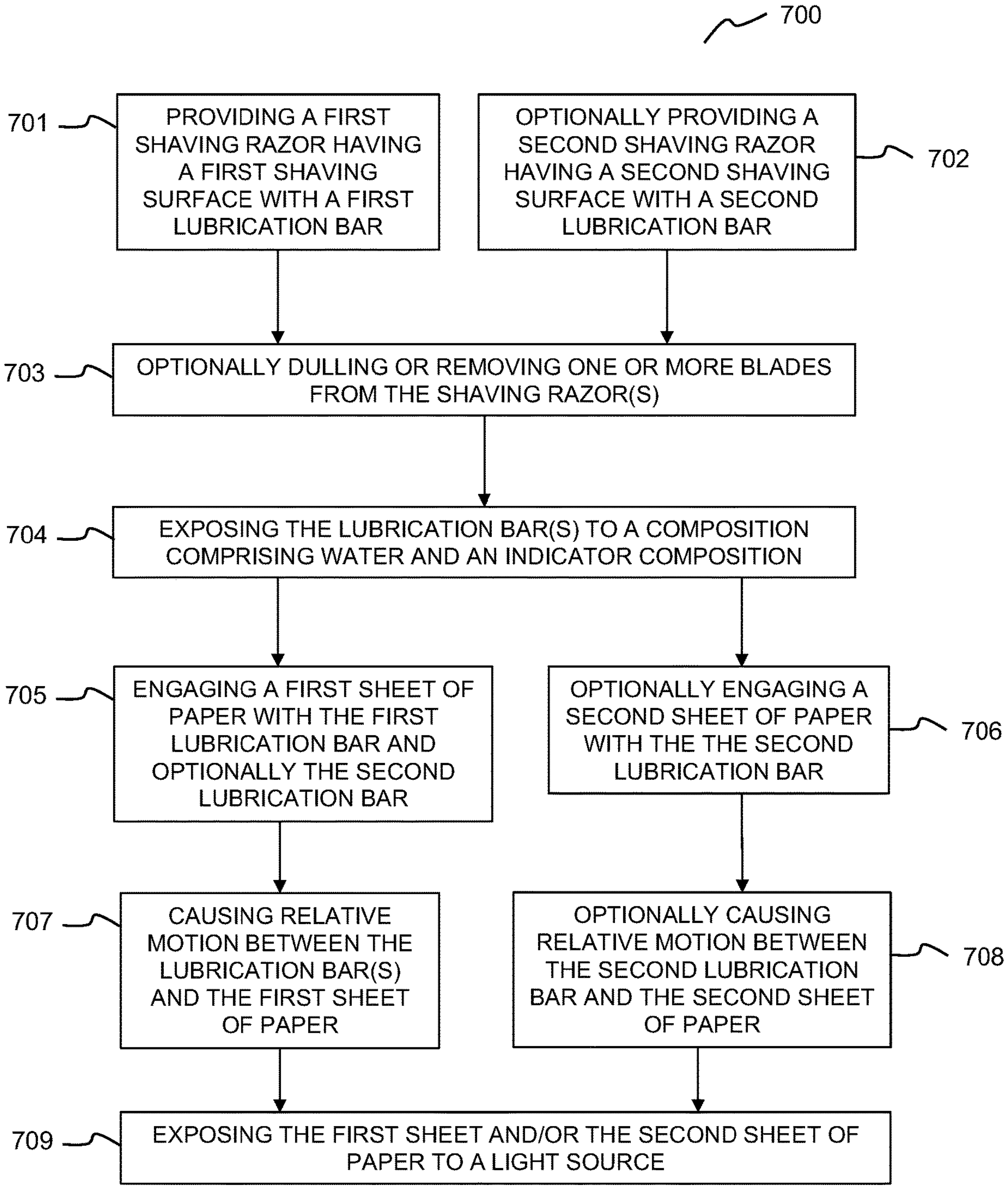
FIG. 8 is an example according to various embodiments illustrating a process flow diagram for a shaving razor demonstration method or a shaving lubrication method.

FIG. 8 is an example according to various embodiments illustrating a process flow diagram for a shaving razor demonstration method or a shaving lubrication demonstration method 700. The method 700 may include a first step 701 of providing a first shaving razor having a first shaving surface with a first lubrication member. The method 700 may optionally include a second step 702 of providing a second shaving razor having a second shaving surface with a second lubrication member. Next, the method 700 may include an optional third step 703 of dulling or removing one or more blades from the shaving razor(s) provided in the preceding step(s). In a fourth step 704, the method 700 may include exposing the lubrication member(s) to a composition comprising water and an indicator composition. The indicator composition may be as described throughout this disclosure. Next, the method 700 may include a fifth step 705 of engaging a first sheet of paper with the first lubrication member and optionally the second lubrication member. An optional sixth step 706 may comprise engaging a second sheet of paper with the second lubrication member. In other words, when provided, the second lubrication member may engage the first sheet of paper or a second sheet of paper. In a seventh step 707, the method 700 may comprise causing relative motion between the lubrication member(s) and the first sheet of paper. In an eighth step 708, the method 700 may comprise causing relative motion between the second lubrication member and the second sheet of paper. The lubrication member(s) may continue to engage the sheet(s) of paper throughout steps 707 and 708 to all the lubrication member(s) to deposit the composition onto the sheet(s) of paper. Finally, the method 700 may include a ninth step 709 of exposing the first sheet and/or the second sheet of paper to a light source. Step 709 may cause any of the composition deposited onto the sheet(s) of paper to fluoresce.

Referring again to FIGS. 3A-3D and to FIGS. 4-6, various embodiments relate to a shaving demonstration apparatus 70 comprising a first sheet of paper 26; a liquid composition 24; a first shaving razor 10 having a first shaving surface 16 with a first lubrication bar 22; a light source 28 transmitting ultraviolet light 29 onto the first sheet of paper 26. The first shaving razor 10 may a first position P1 with the first lubrication bar 22 depositing the liquid composition 24 onto the first sheet of paper 26. The apparatus 70 may further comprise a first tank 72 containing the liquid composition 24. The first shaving razor 10 may have a second position P2 with the first lubrication bar 22 positioned within the first tank 72. The first sheet of paper 26 may comprise a first roll of paper 76. The shaving demonstration 70 may further comprise a conveyor mechanism 79*a*, 79*b* that moves the first sheet of paper relative to the first shaving razor 10. The conveyor mechanism may be a hand crank 79*a* as shown in FIG. 3A or a motor 79*b* as shown in FIG. 3B. The conveyor mechanism may spin a first acceptor roll 78 around an axis to unwind the first sheet of paper 26 from the first roll 76 and onto the first acceptor roll 78. It is to be appreciated that a first spindle 81 may be inserted through the central hole of the first roll 76 and a second spindle (not shown) may be inserted through the first acceptor roll 78. The first spindle 81 and/or the second spindle may be supported by separate structure, such as an independent support 85, or may be supported by the apparatus 70, for example by connection to the support structure 80 via an integral support structure 83. The spindle(s) may be removable to facilitate changing of the roll(s). Repetition of the various configurations of the support structures is omitted as unnecessary.

According to various embodiments, the shaving demonstration apparatus 70 may further comprise a second shaving razor 40 having a second shaving surface 46 with a second lubrication bar 52. The second shaving razor 40 may have a first position P3 with the second lubrication bar 52 depositing the liquid composition 24 onto the first sheet of paper 56, as shown in FIG. 3B. Alternatively, the shaving demonstration apparatus 70 may comprise a second sheet of paper 56; a second shaving razor 40 having a second shaving surface 46 with a second lubrication bar 52. The second shaving razor 40 may have a first position P5 with the second lubrication bar 52 depositing the liquid composition 24 onto the second sheet of paper 56, as shown in FIG. 3D. The shaving demonstration apparatus 70 may further comprise a second tank 74 containing the liquid composition 24. The second shaving razor 40 may have a second position P4 with the second lubrication bar 52 positioned within the second tank 74. The second shaving razor 40 may have a second position P6 with the second lubrication bar 52 positioned within the first tank 72. The second sheet of paper 56 may comprise a second roll of paper 77. The conveyor mechanism 79*a*, 79*b* may move the second sheet of paper 56 relative to the second shaving razor 40. The conveyor mechanism may spin a second acceptor roll 79 around an axis to unwind the second sheet of paper 56 from the second roll 77 and onto the second acceptor roll 79. It is to be appreciated that the first spindle may be inserted through the central hole of the first roll 76 and the second roll 77 and the second spindle may be inserted through the first acceptor roll 78 and the second acceptor roll 79. The first spindle and the second spindle may be supported by separate structure, such as an independent support 85, or may be supported by the apparatus 70, for example by connection to the support structure 80 via an integral support structure 83. It is also to be appreciated that the first acceptor roll 78 and the second acceptor roll 79 may each have their own spindle and their own independently operable conveyor mechanisms. The spindle(s) may be removable to facilitate changing of the roll(s). Repetition of the various configurations of the support structures is omitted as unnecessary.

The apparatus 70 may further comprise a support structure 80 on which the sheet(s) of paper 26, 56 may disposed. The support structure 80 may comprise a first sidewall 82 and a second side wall 84, as illustrated in FIG. 4. The first sidewall 82 and the second side wall 84 may support a crossbar 86. The crossbar 86 may be permanently or removably mounted. The crossbar 86 may be adjustable such that it may be tightened or loosened, for example via a hex pin or screw. When the crossbar 86 is tightened, it may be substantially immobilized such that it does not rotate. A first arm 88 may be pivotably mounted on the crossbar 86 via a first pivot 90. The first pivot 90 may be adjustable such that it may be tightened or loosened, for example via a hex pin or screw. When the first pivot 90 is tightened, it may be substantially immobilized such that it does not rotate about the crossbar 86. The first arm 88 may comprise a first adjustable razor grip 92 for gripping the first shaving razor 10 by the first handle 12. A second arm 94 may be pivotably mounted on the crossbar 86 via a second pivot 96. The second pivot 96 may be adjustable such that it may be tightened or loosened, for example via a hex pin or screw. When the second pivot 96 is tightened, it may be substantially immobilized such that it does not rotate about the crossbar 86. The second arm 94 may comprise a second adjustable razor grip 98 for gripping the second shaving razor 40 by the second handle 42.

EXAMPLE

The following example is put forth to provide those of ordinary skill in the art with a complete disclosure and description of how to perform the methods, how to make, and how to use the compositions and compounds disclosed and claimed herein. Efforts have been made to ensure accuracy with respect to numbers (e.g., amounts, temperature, etc.), but some errors and deviations should be accounted for. The purpose of the following example is not to limit the scope of the various embodiments, but merely to provide examples illustrating specific embodiments.

Resources Used

The following items were employed: a yellow SHARPIE® highlighter, 32 oz plastic beaker, multiple rolls of 3" thermal paper, a hex key wrench tool set, a dental pick or small file, a pair of needle nose pliers, two 21" black-lights, a measuring tape, a pair of scissors, a permanent marker, and one or more shaving razors.

Step 1: Prepare Cartridges

For some razors no adjustment is needed. For other razors it is only necessary to use the needle nose pliers to remove metal side clips from each cartridge and to then remove the blades. For still other razors, the blades are not removed because the blades are molded into the blade cartridge and cannot be removed. To keep product variability the same across all products, it is possible to use a dental pick or file to dull the blades from end to end to ensure that they do not impinge upon the paper during the demonstration.

Step 2: Prepare Shaving Demonstration Apparatus

Hex keys may be used to loosen any elements of the shaving demonstration apparatus that need to be adjusted. For example, any side clamps that hold the crossbar on the support structure may need to be loosened. Place metal spindle inserts into the holes on 2 rolls of thermal paper. Place 2 rolls of thermal paper inside the rig and align with the holes for the metal rod. Insert the metal rod through both rolls of thermal paper, replace the metal clamps, and tighten down with hex key.

After installing 2 rolls of thermal paper, use a hex key to attach the test products to the 2 pivoting arms located on top of the device. Do not tighten. Once the test products are attached to the pivoting arm, place them face down on the square plexiglass strips on the test surface. For optimal surface contact, adjust the handle until the cartridge lays flat and is centered on the square plexiglass strips. After adjusting for optimal surface contact, tighten the hex bolt attaching the test products using a hex key and pliers. Ensure the handles are now locked in position and aren't moving.

Before testing, place the shaving demonstration apparatus on a flat surface and align one black light above and perpendicular to the system. Align the second black light above the path the paper will be pulled for optimal visibility.

Step 3: Prepare UV Solution

Fill a 32 oz beaker with room temperature (warm) water. Use pliers to remove the end cap from 3 Yellow SHARPIE® highlighters and drop the cotton inserts into the water. Let the inserts soak for approximately 10 minutes. Before removing, use your hand to squeeze each of the cotton inserts to remove remaining liquid. After removing the cotton inserts, split the UV solution into 2 separate 8 oz containers.

Step 4: Testing

Start to unroll the thermal paper over the top of the support structure, which may comprise a plexiglass surface for the test razors to rest upon. Extend the paper past the front of the support structure. Optionally attach the paper to a receiving roller. Next, place the containers holding the UV solution on the top backside of the support structure and on top of the thermal paper. Flip over the test razors and submerge them into the solution without allowing the lubrication members to touch the surface/sides of the container. Soak the test razors for about 3 minutes. A 3 minute soak is required for the first run only, all subsequent runs require a 10 sec soak before repeating. After completing the required soaking time, carefully lift the test razors and remove the UV solution container. Carefully rotate the test razors to their starting position with the cartridge face down on the thermal paper. Ensure the black lights are on and shut off the white lights. Carefully grip the ends of both pieces of thermal paper and slowly pull the thermal paper through the system at a steady and consistent rate of speed.

Once the saturated lubrication members stop distributing UV visible ink, stop pulling the thermal paper rolls. Use scissors to cut the paper after the last indication of visible UV ink. Lay the paper on a flat surface and measure the length of visible UV ink left on the paper. Start by measuring where the razors started on the paper and stop where there is a visible break in lubrication distribution. Record the data. Repeat the steps above for a minimum of 10 runs per product. If the first two pulls are breaking under 10-15 inches (about 254 to about 381 mm), check the cartridge to ensure optimal surface contact. Short breaks may indicate an adjustment is needed.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving demonstration method comprising:

providing a first shaving razor having a first shaving surface with a first lubrication member;

exposing the first lubrication member to a composition comprising water and an ultraviolet fluorescent dye;

engaging a first sheet of paper with the first lubrication member after the exposing the first lubrication member to the composition;

causing relative motion between the first lubrication member and the first sheet of paper after the engaging the first sheet of paper with the first lubrication member; and exposing the first sheet of paper to a light source transmitting ultraviolet light.

2. The method of claim 1, wherein the relative motion between the first lubrication member and the first sheet of paper occurs at a rate of about 1 inch (about 25.4 mm) per second to about 5 inches (about 127 mm) per second.

3. The method of claim 1, wherein the first lubrication member has a first leading edge and a first trailing edge, wherein during the engaging the first sheet of paper with the first lubrication member, the first lubrication member and the first sheet of paper define a first contact angle having a first vertex on the first leading edge or on the first trailing edge, and wherein the first contact angle is in a range of from about 0 to about 5 degrees.

4. The method of claim 1, further comprising:

providing a second shaving razor having a second shaving surface with a second lubrication member;

exposing the second lubrication member to the composition;

engaging the first sheet of paper with the second lubrication member after the exposing the second lubrication member to the composition; and causing relative motion between the second lubrication member and the first sheet of paper after said engaging the first sheet of paper with the second lubrication member.

5. The method of claim 4, wherein the relative motion between the second lubrication member and the first sheet of paper occurs at a rate of about 1 inch (about 25.4 mm) per second to about 5 inches (about 127 mm) per second.

6. The method of claim 4, wherein the second lubrication member has a second leading edge and a second trailing edge, wherein during the engaging the first sheet of paper with the second lubrication member, the second lubrication member and the first sheet of paper define a second contact angle having a second vertex on the second leading edge or on the second trailing edge, and wherein the second contact angle is in a range of from about 0 to about 5 degrees.

7. The method of claim 4, wherein the exposing the second lubrication member to the composition comprises dipping the second lubrication member into a second tank containing the composition for a time interval of from about 1 to about 3 minutes.

8. The method of claim 1, further comprising:

providing a second shaving razor having a second shaving surface with a second lubrication member;

exposing the second lubrication member to the composition;

engaging a second sheet of paper with the second lubrication member after the exposing the second lubrication member to the composition;

causing relative motion between the second lubrication member and the second sheet of paper after the engaging the second sheet of paper with the second lubrication member; and exposing the second sheet of paper to the light source.

9. The method of claim 8, wherein the relative motion between the second lubrication member and the second sheet of paper occurs at a rate of about 1 inch (about 25.4 mm) per second to about 5 inches (about 127 mm) per second.

10. The method of claim 8, wherein the second lubrication member has a second leading edge and a second trailing edge, wherein during the engaging the second sheet of paper with the second lubrication member, the second lubrication member and the second sheet of paper define a second contact angle having a second vertex on the second leading edge or on the second trailing edge, and wherein the second contact angle is in a range of from about 0 to about 5 degrees.

11. The method of claim 1, further comprising dulling or removing one or more blades from the first shaving razor and/or the second shaving razor.

12. The method of claim 1, wherein the composition comprises water in an amount of from about 95% by weight to about 99% by weight.

13. The method of claim 1, wherein the first sheet of paper is thermal paper and/or wherein the second sheet of paper is thermal paper.

14. The method of claim 1, wherein the exposing the first lubrication member to the composition comprises dipping the first lubrication member into a first tank containing the composition for a time interval of from about 1 to about 3 minutes.

15. The method of claim 1, wherein the light source substantially emits light having a wavelength in a range of from about 100 to about 400 nm only.

16. The method of claim 1, wherein the light source substantially emits light having a wavelength in a range of from about 320 to about 400 nm only.

17. A shaving lubrication demonstration method comprising:

exposing a first lubrication member to a composition comprising water and a dye;

engaging a first sheet of paper with the first lubrication member after the exposing the first lubrication member to the composition; and moving the first lubrication member relative to the first sheet of paper after the engaging the first sheet of paper with the first lubrication member.

18. The method of claim 17, further comprising:

exposing a second lubrication member to the composition;

engaging the first sheet of paper with the second lubrication member after the exposing the second lubrication member to the composition; and moving the second lubrication member relative to the first sheet of paper after the engaging the first sheet of paper with the second lubrication member.

19. The method of claim 17, further comprising:

exposing a second lubrication member to the composition;

engaging a second sheet of paper with the second lubrication member after the exposing the second lubrication member to the composition; and moving the second lubrication member relative to the second sheet of paper after the engaging the second sheet of paper with the second lubrication member.

20. The method claim 17, wherein the exposing the first lubrication member comprises dipping the first lubrication member into a first tank containing the composition.

* * * * *